(12) United States Patent
Ruehmann et al.

(10) Patent No.: US 11,773,662 B2
(45) Date of Patent: Oct. 3, 2023

(54) TUBULAR STRING MAKE-UP METHODS UTILIZING IMAGE PROCESSING

(71) Applicant: WEATHERFORD TECHNOLOGY HOLDINGS, LLC, Houston, TX (US)

(72) Inventors: Rainer Ruehmann, Hannover (DE); David Geissler, Hannover (DE); Benjamin Sachtleben, Hannover (DE); Christina Hebebrand, Hannover (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 361 days.

(21) Appl. No.: 16/874,266

(22) Filed: May 14, 2020

(65) Prior Publication Data

US 2021/0355765 A1    Nov. 18, 2021

(51) Int. Cl.
*G06T 7/00* (2017.01)
*E21B 19/16* (2006.01)
(Continued)

(52) U.S. Cl.
CPC .......... *E21B 19/165* (2013.01); *E21B 17/042* (2013.01); *G06T 7/0004* (2013.01);
(Continued)

(58) Field of Classification Search
CPC ... E21B 19/165; E21B 17/042; G06T 7/0004; G06T 2207/30108; G06T 2207/30204;
(Continued)

(56) References Cited

U.S. PATENT DOCUMENTS

2005/0077084 A1    4/2005 Kracik et al.
2013/0345878 A1*   12/2013 Austefjord ............... H04N 7/18
                                                      348/82
(Continued)

FOREIGN PATENT DOCUMENTS

RU          2297511 C2     4/2007

OTHER PUBLICATIONS

European Office Action dated Dec. 21, 2022 for EP Patent Application No. 21724111.6, 3 pages.
Avago Technology; "ADNS-9800 LaserStream Gaming Sensor", company data sheet AV02-2998EN, Dated Jan. 13, 2012, 40 pages.
Weatherford; "ComCAM-20/160-SL Bucking Machine", Tech Specs company article 12138.00, dated 2015, 2 pages.
(Continued)

*Primary Examiner* — Sheela C Chawan
(74) *Attorney, Agent, or Firm* — Smith IP Services, P.C.

(57) ABSTRACT

A method of making-up tubular string components can include inputting to an image processor image data output from at least one camera, the image processor in response detecting positions of a tubular and a mark on another tubular, threading the tubulars with each other while inputting position data from the image processor to a controller, and the controller terminating the threading in response to the position of the mark relative to the position of the first tubular being within a predetermined range. Another method of making-up tubular string components can include, in response to inputting image data to an image processor, the image processor detecting longitudinal positions of two tubulars, threading the tubulars with each other, and a controller terminating the threading in response to the longitudinal position of one tubular relative to the longitudinal position of the other tubular being within a predetermined range.

16 Claims, 7 Drawing Sheets

(51) Int. Cl.
  *E21B 17/042* (2006.01)
  *B64U 101/30* (2023.01)
(52) U.S. Cl.
  CPC  *B64U 2101/30* (2023.01); *G06T 2207/30108* (2013.01); *G06T 2207/30204* (2013.01)
(58) Field of Classification Search
  CPC .......... G06T 7/269; G06T 2207/10016; B64C 2201/123; F16L 15/001; F16L 2201/10; F16L 2201/60
  USPC ........................................................ 382/141
  See application file for complete search history.

(56) References Cited

U.S. PATENT DOCUMENTS

| | | | |
|---|---|---|---|
| 2014/0233804 A1 | 8/2014 | Gustavsson et al. | |
| 2016/0241767 A1* | 8/2016 | Cho ..................... | G06F 3/0346 |
| 2017/0362905 A1* | 12/2017 | Mailly ................. | G06K 9/6282 |
| 2019/0057516 A1 | 2/2019 | Amezaga et al. | |
| 2019/0119997 A1* | 4/2019 | Helms ................... | B23P 19/061 |
| 2019/0136650 A1* | 5/2019 | Zheng .................... | E21B 44/00 |
| 2019/0195034 A1* | 6/2019 | Leite ..................... | E21B 19/165 |
| 2020/0088873 A1 | 3/2020 | Blakely et al. | |
| 2020/0224526 A1* | 7/2020 | Parmeshwar ......... | E21B 47/024 |
| 2021/0355765 A1 | 11/2021 | Ruehmann et al. | |

OTHER PUBLICATIONS

PX4FLOW; "PX4FLOW Smart Camera", Pixhawk Flight Controller Hardware Project, dated Jan. 11, 2014-Oct. 27, 2019, 6 pages.
Weatherford; "TorkWrench 10-160 Mobile Bucking Unit", Tech Specs company article 12028.01, dated 2015, 1 page.
Weatherford; "VERO Automated Connection Integrity", Company article 12927.00, dated 2020, 2 pages.
Weatherford; "VERO Conventional System", Tech Specs company article 12723.03, dated 2017-2018, 2 pages.
Weatherford; "VERO Mechanized System", Tech Specs company article 12923.00, dated 2018, 2 pages.
Notice of Allowance dated May 24, 2021 for U.S. Appl. No. 16/874,405, 14 pages.
International Search Report with Written Opinion dated Jun. 28, 2021 for PCT Patent Application No. PCT/US2021/028533, 13 pages.
Office Action dated Sep. 10, 2021 for U.S. Appl. No. 16/874,405, 11 pages.
International Search Report with Written Opinion dated Oct. 14, 2021 for PCT patent application No. PCT/US2021/027880, 19 pages.
Office Action dated Dec. 16, 2021 for U.S. Appl. No. 16/874,405, 13 pages.
Office Action dated Aug. 8, 2022 for U.S. Appl. No. 16/874,266, 36 pages.

* cited by examiner

TUBULAR STRING MAKE-UP METHODS UTILIZING IMAGE PROCESSING

BACKGROUND

This disclosure relates generally to equipment utilized and operations performed in conjunction with a subterranean well and, in certain examples described below, more particularly provides for utilization of image processing in tubular string make-up operations.

Various types of tubular components can be threaded together to form tubular strings for use in a well. Tubulars used in wells can include protective wellbore linings (such as, casing, liner, etc.), production or injection conduits (such as, production tubing, injection tubing, screens, etc.), drill pipe and drill collars, and associated components (such as tubular couplings).

It is typically important for threaded connections between tubulars to be properly made-up. For example, when a threaded connection is properly made-up, the threaded connection may prevent leakage of fluid into or out of the tubular string, or may resist unthreading of the connection.

It will, therefore, be readily appreciated that improvements are continually needed in the art of making-up threaded connections in tubular strings. The present disclosure provides such improvements to the art.

DETAILED DESCRIPTION

Figure 1:
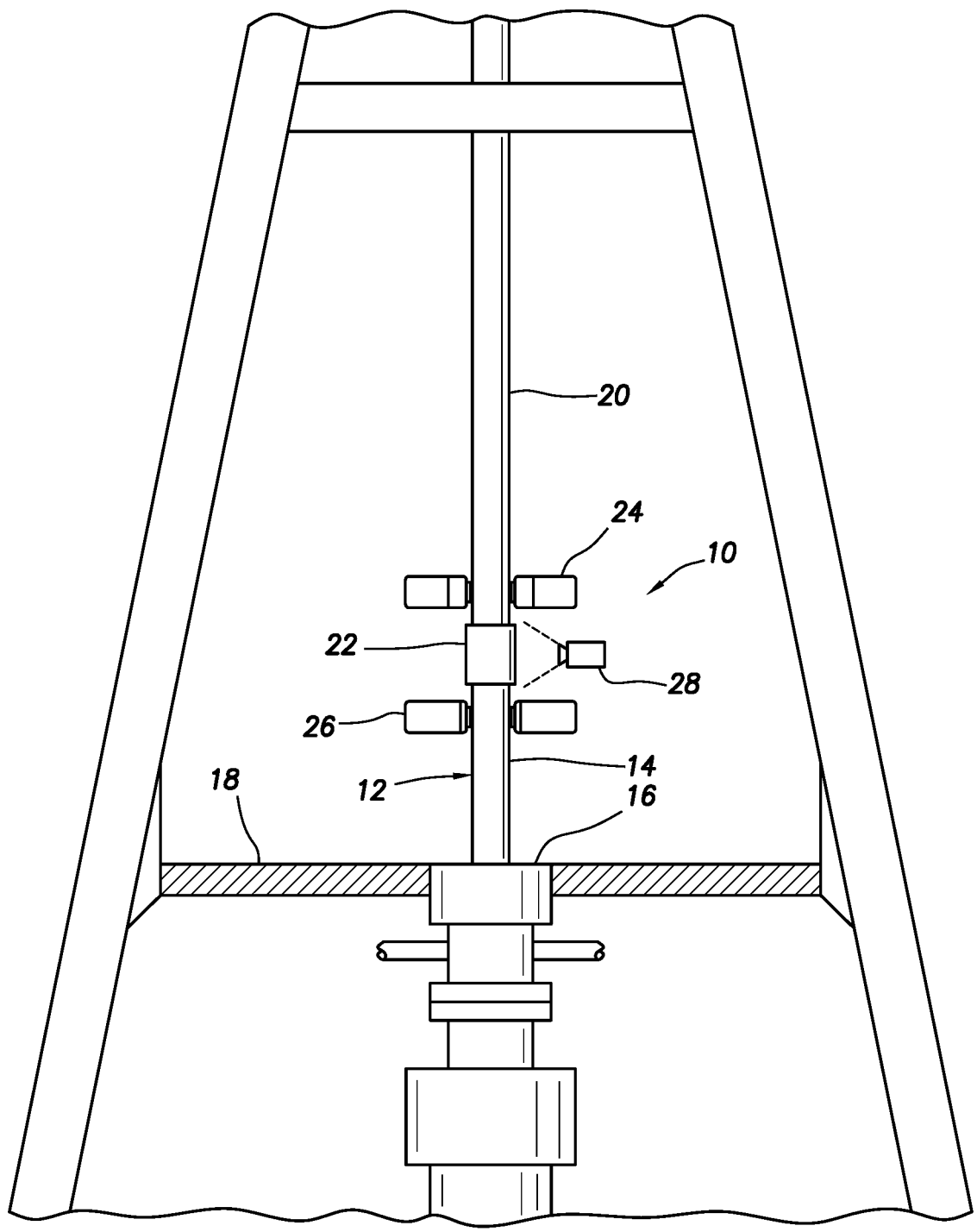
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is being assembled and deployed into a well. The tubular string 12 in this example is a production or injection tubing string, but in other examples the tubular string could be a casing, liner, drill pipe, completion, stimulation, testing or other type of tubular string. The scope of this disclosure is not limited to use of any particular type of tubular string, or to any particular tubular components connected in a tubular string.

As depicted in FIG. 1, a tubular 14 is suspended near its upper end by means of a rotary table 16, which may comprise a pipe handling spider and/or safety slips to grip the tubular 14 and support a weight of the tubular string 12. In this manner, the upper end of the tubular 14 extends upwardly through a rig floor 18 in preparation for connecting another tubular 20 to the tubular string 12.

In this example, a tubular coupling 22 is made-up to the upper end of the tubular 14 prior to the tubular 14 being connected in the tubular string 12. The coupling 22 is internally threaded in each of its opposite ends.

In conventional well operations, it is common for a threaded together tubular and coupling to be referred to as a "joint" and for threaded together joints to be referred to as a "stand" of tubing, casing, liner, pipe, etc. However, in some examples, a separate coupling may not be used; instead one end (typically an upper "box" end of a joint) is internally threaded and the other end (typically a lower "pin" end of the joint) is externally threaded, so that successive joints can be threaded directly to each other.

Thus, the scope of this disclosure can encompass the use of a separate coupling with a tubular, or the use of a tubular without a separate coupling (in which case the coupling can be considered to be integrally formed with, and a part of, the tubular). In the FIG. 1 example, the coupling 22 can also be considered to be a tubular, since it is a tubular component connected in the tubular string 12.

To make-up a threaded connection between the tubular 20 and the coupling 22, a set of tongs or rotary and backup clamps 24, 26 are used. The rotary clamp 24 in the FIG. 1 example is used to grip, rotate and apply torque to the upper tubular 20 as it is threaded into the coupling 22.

The backup clamp 26 in the FIG. 1 example is used to grip and secure the lower tubular 14 against rotation, and to react the torque applied by the rotary clamp 24. The rotary clamp 24 and the backup clamp 26 may be separate devices, or they may be components of a rig apparatus known to those skilled in the art as an "iron roughneck."

In one example, the rotary clamp 24 and backup clamp 26 may be components of a tong system, such as the VERO™ tong system marketed by Weatherford International, Inc. of Houston, Tex. USA. In this example, the rotary clamp 24 may be a mechanism of the tong system that rotates and applies torque to the upper tubular 20, and the backup clamp 26 may be a backup mechanism of the tong system that reacts the applied torque and prevents rotation of the lower tubular 14. Thus, the term "rotary clamp" as used herein indicates the rotation and torque application mechanism, and the term "backup clamp" as used herein indicates the torque reacting mechanism.

Note that it is not necessary for the tubulars 14, 20 (and coupling 22, if used) to be vertical in the tubular make-up operation. The tubulars 14, 20 could instead be horizontal or otherwise oriented. Additional systems in which the principles of this disclosure may be incorporated include the CAM™, COMCAM™ and TORKWRENCH™ bucking systems marketed by Weatherford International, Inc.

In other examples, a top drive (not shown) may be used to rotate and apply torque to the upper tubular 20. Thus, it will be appreciated that the scope of this disclosure is not limited to use of any particular equipment to grip, rotate, apply torque to, or react torque applied to, any tubular in a threaded connection make-up operation.

After the upper tubular 20 is properly made-up to the lower tubular 14 or coupling 22, the tubular string 12 can be lowered further into the well, and the make-up operation can be repeated to connect another stand to the upper end of the tubular string. In this manner, the tubular string 12 is progressively deployed into the well by connecting successive stands to the upper end of the tubular string. In some examples, an individual tubular component may be added to the tubular string 12, instead of a stand.

In the FIG. 1 method, the threaded connection make-up process can be controlled, so that a properly made-up connection is obtained, and this control can be automatic, so that human error is avoided. As described more fully below, at least one camera 28 can be used in certain examples to facilitate this automatic control of the threaded connection make-up process.

As used herein, the term "camera" is used to indicate a device capable of obtaining images of an observed structure. Each image can comprise an array or matrix of pixels, with each pixel having a combination of optical characteristics. Examples of cameras include digital video cameras, time of flight sensors and optical matrix sensors. Preferably, a camera does not contact a structure observed by the camera.

Figure 2A:
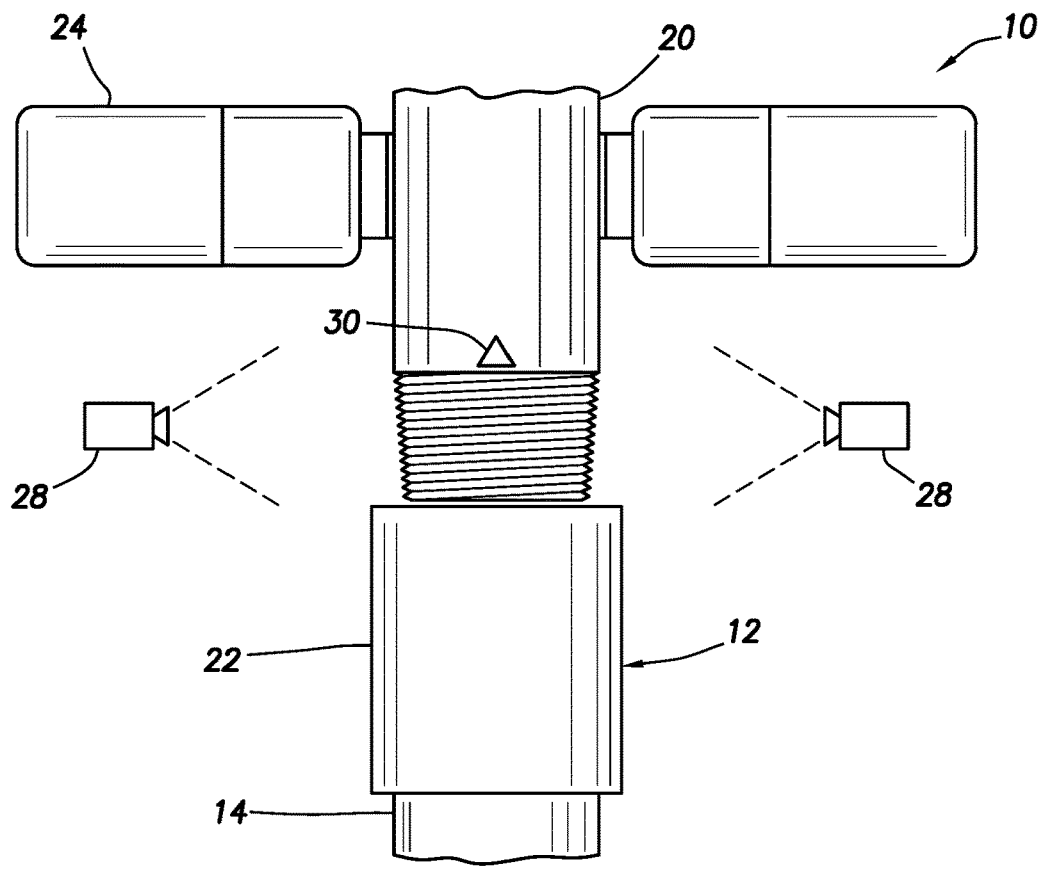
FIGS. 2A & B are representative side views of an example of the method, with a threaded connection in respective preliminary and made-up configurations.

Referring additionally now to FIGS. 2A & B, a first example of the method of making-up tubular string components is representatively illustrated. For convenience, various examples of the method are described below as they may be used with the system 10 of FIG. 1, but the methods may be used with other systems in keeping with the principles of this disclosure.

As depicted in FIG. 2A, the threaded connection make-up process has been initiated. The tubular 20 is positioned above and axially aligned with the coupling 22, with the rotary clamp 24 appropriately positioned to grip an outer surface of the tubular 20. The backup clamp 26 (see FIG. 1) can grip an outer surface of the tubular 14 to react torque applied during the threaded connection make-up process.

A mark 30 is provided on the outer surface of the tubular 20 for use as an indicator of when a proper threaded connection has been achieved. In this example, the mark 30 is in the shape of a triangle having a base facing toward the lower end of the tubular 20. The threaded connection is properly made-up when the upper end of the coupling 22 is axially or longitudinally aligned with the base of the triangle mark 30, or at least within a predetermined distance range of the base of the triangle mark. In other examples, different shapes (such as, circles, lines, rectangles, etc.), alignments (such as, centered, adjacent, etc.) or positions of marks may be used to indicate a properly made-up threaded connection.

As depicted in FIG. 2A, multiple cameras 28 (only two of which are visible in the drawing) are positioned about the tubular 20 and coupling 22. In this example, the cameras 28 may be distributed circumferentially about the tubular 20 and coupling 22, so that the mark 30 can be observed by the cameras in all azimuthal positions of the mark, including when the tubular 20 is rotated by the rotary clamp 24 to make-up the threaded connection. Any number of cameras 28 may be used.

While the tubular 20 is rotated by the rotary clamp 24, the cameras 28 can observe the mark 30, including its longitudinal position relative to the upper end of the coupling 22. The cameras 28 are connected to an image processor 54 (described more fully below, see FIG. 7), and the image processor is capable of identifying or recognizing images of the coupling 22 and mark 30 in image data output by the cameras.

Once the images of the coupling 22 and mark 30 are identified by the image processor, the longitudinal distance between the positions of the coupling and mark can be conveniently determined. A controller 52 (described more fully below, see FIG. 7) receives position data from the image processor and terminates the rotation of the tubular 20 by the rotary clamp 24 when the threaded connection has been properly made-up.

Figure 2B:
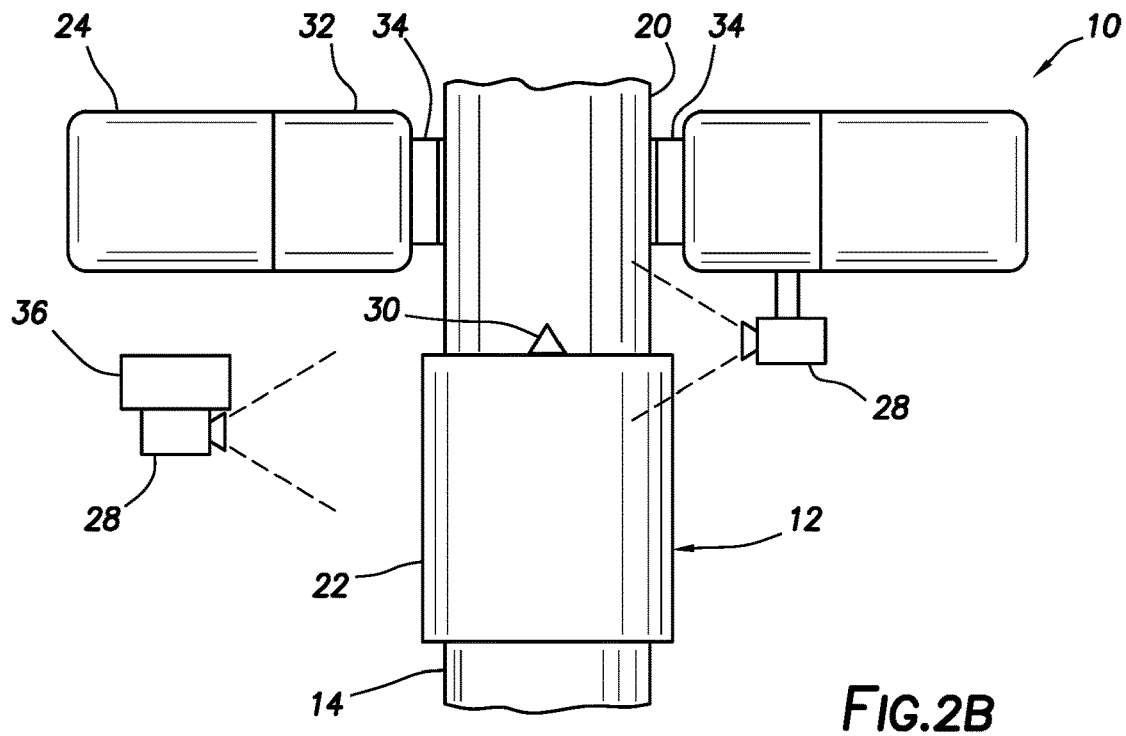

Referring additionally now to FIG. 2B, the threaded connection is representatively illustrated after the tubular 20 has been properly threaded into the coupling 22. Note that the upper end of the coupling 22 is now longitudinally aligned with the base of the triangle mark 30 (or at least within a predetermined distance range of the base of the triangle mark).

In the FIG. 2B example, the cameras 28 are able to rotate with the tubular 20 as it is threaded into the coupling 22, instead of being in fixed positions about the tubular 20 and coupling 22. On the right-hand side of FIG. 2B, one of the cameras 28 is attached to a rotor 32 of the rotary clamp 24.

The rotor 32 is rotated by a motor (not shown) of the rotary clamp 24. Jaws 34 carried in the rotor 32 grip the outer surface of the tubular 20, thereby transmitting torque from the rotor to the tubular as the tubular is threaded into the coupling 22. If a top drive is instead used to rotate the tubular 20, then the rotor 32 could be a component of the top drive mechanism that rotates with the tubular. The scope of this disclosure is not limited to use of any particular component to mount a camera so that the camera rotates with the tubular 20 while the threaded connection is made-up.

On the left-hand side of FIG. 2B, one of the cameras 28 is attached to an aerial vehicle 36 (such as a drone). The controller mentioned above and described more fully below may be used to control a flight path of the aerial vehicle 36, so that the camera 28 can continuously observe the mark 30 and the coupling 22 while the tubular 20 is threaded into the coupling. Thus, the camera 28 supported by the aerial vehicle 36 will rotate with the tubular 20, and will observe the mark 30, as the threaded connection is made-up.

Because each of the two cameras 28 in the FIG. 2B example can rotate with the tubular 20 and continuously observe the mark 30 and the coupling 22 while the threaded connection is made-up, it is not necessary for multiple cameras to be used. However, multiple cameras 28 can be used if desired, for example, to provide redundancy or for other purposes.

As described above, the controller 52 can terminate the threading of the tubular 20 into the coupling 22 when the position of the mark 30 (such as a longitudinal position of the base of the mark) relative to the position of the coupling 22 (such as a longitudinal position of an upper end of the coupling) is within a predetermined range. In some examples, additional conditions may need to be satisfied for the threaded connection to be considered acceptable. Thus, the scope of this disclosure is not limited to use of only the relative positions of the mark 30 and the coupling 22 to indicate a proper or acceptable threaded connection.

For example, a minimum torque or range of torque values may need to be applied to the threaded connection in order for the threaded connection to be accepted or approved for use in the well. A sensor (such as a torque sensor of the rotary clamp 24, a top drive, a bucking unit or an "iron roughneck") may be used to monitor the torque applied during the threaded connection make-up process.

In the FIGS. 2A & B example, the method can include the steps of:

1. inputting image data to an image processor 54 (see FIG. 7), the image data being output from at least one camera 28;

2. in response to the inputting step, the image processor 54 detecting positions of a threaded tubular (such as the coupling 22 or tubular 14) and a mark 30 on another threaded tubular 20;

3. threading together the tubular 20 and coupling 22;

4. during the threading step, inputting position data from the image processor 54 to a controller 52 (see FIG. 7), the position data being indicative of the position of the mark 30 relative to the position of the coupling 22; and 5. the controller 52 terminating the threading step in response to the position of the mark 30 relative to the position of the coupling 22 being within a predetermined range.

The controller 52 may terminate the threading step in response to a longitudinal distance between the positions of the coupling 22 and the mark 30 being within the predetermined range, for example, in response to the base of the mark 30 being longitudinally aligned with the upper end of the coupling 22 or within a predetermined longitudinal distance of the upper end of the coupling.

The threading step may include rotating the tubular 20 relative to the coupling 22. The camera 28 may rotate with the tubular 20 during the threading step.

The method may include connecting the camera 28 to a rotor 32 used to rotate the tubular 20, so that the camera 28 rotates with the rotor 32. The method may include connecting the camera 28 to an aerial vehicle 36. A flight path of the aerial vehicle 36 may be controlled by the controller 52 in response to the position data output from the image processor 54.

Figure 3A:
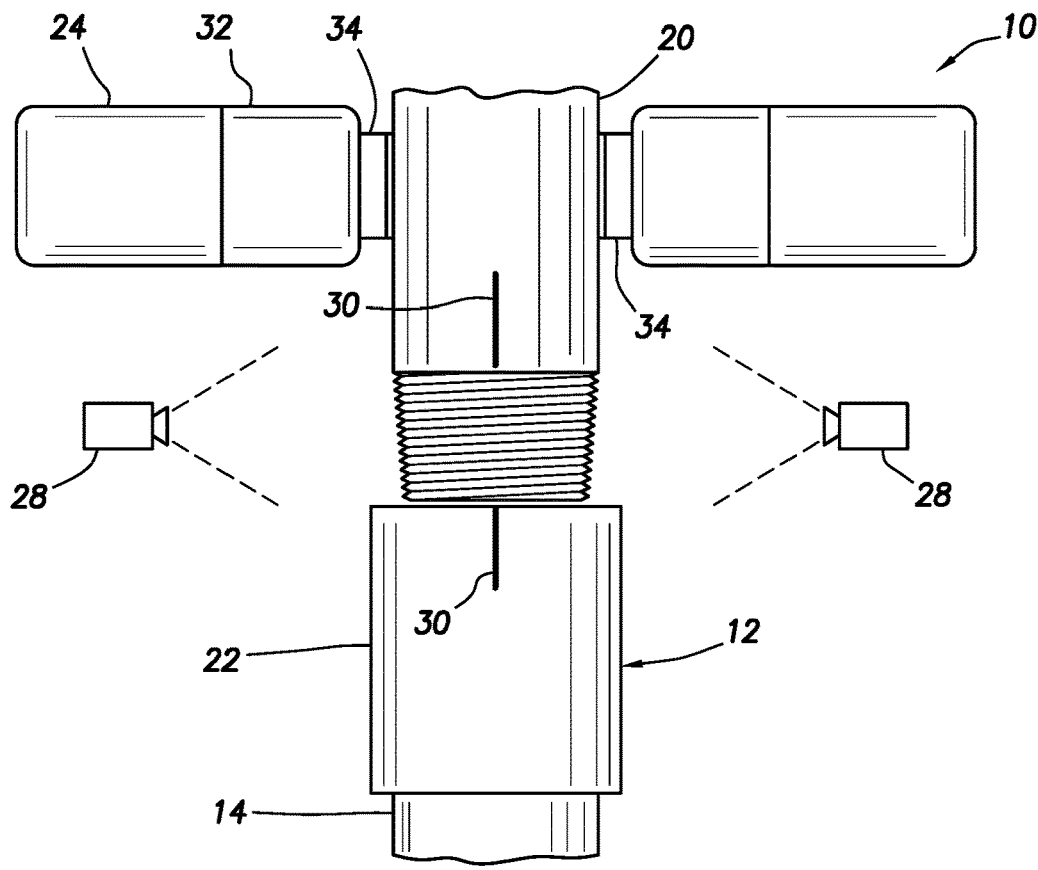
FIGS. 3A & B are representative side views of another example of the method, with a threaded connection in respective preliminary and made-up configurations.

Referring additionally now to FIGS. 3A & B, a second example of the method of making-up tubular string components is representatively illustrated. In this example, each of the tubular 20 and the coupling 22 is provided with the mark 30 in the form of a longitudinally extending line on its outer surface. The threaded connection is properly made-up when the marks 30 are azimuthally aligned (or within a predetermined range of such alignment) after the tubular 20 has shouldered up against the coupling 22.

The cameras 28 observe the marks 30 as the tubular 20 is threaded into the coupling 22. Image data from the cameras 28 is input to the image processor 54 in order to identify or recognize the azimuthal positions of the marks 30 while the tubular 20 is threaded into the coupling 22.

A torque sensor (such as the torque sensor mentioned above for monitoring the torque applied during the threaded connection make-up process) may be connected to the controller 52 and used to determine when the tubular 20 has shouldered up against the coupling 22. Thereafter, when it is determined that the azimuthal positions of the marks 30 are aligned (or within a predetermined range of such alignment), the controller 52 can terminate the rotation of the tubular 20 by the rotary clamp 24.

As depicted in FIG. 3A, the tubular 20 is positioned above and axially aligned with the coupling 22 in preparation for initiating the threaded connection make-up process. The cameras 28 observe the marks 30. Image data is output from the cameras 28 to the image processor 54, which identifies or recognizes the marks 30 and the azimuthal positions of the marks.

Figure 3B:
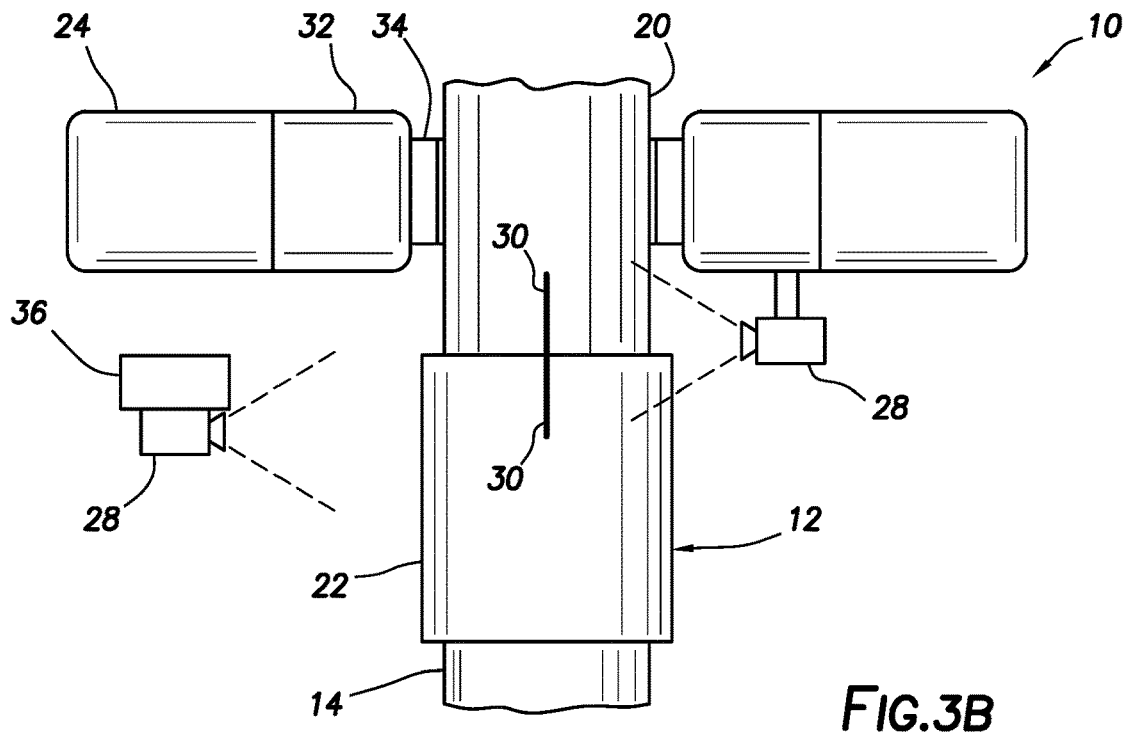

As depicted in FIG. 3B, the tubular 20 is rotated by the rotary clamp 24 and is thereby threaded into the coupling 22 until at least two conditions are satisfied: 1) the tubular 20 is shouldered up against the coupling 22, and 2) after shouldering up, the marks 30 are azimuthally aligned with each other (or within a predetermined range of such alignment). When these conditions are satisfied, the controller 52 terminates the rotation of the tubular 20 by the rotary clamp 24.

Note that the cameras 28 illustrated in FIG. 3A are in fixed positions relative to the tubular 20 and the coupling 22, and the cameras illustrated in FIG. 3B are rotatable with the tubular 20 relative to the coupling. Any number, positions, displacement or arrangement of the cameras 28 may be used in the FIGS. 3A & B example in keeping with the principles of this disclosure.

In the FIGS. 3A & B example, the method can include the steps of:

1. inputting image data to an image processor 54 (see FIG. 7), the image data being output from at least one camera 28;

2. in response to the inputting step, the image processor 54 detecting positions of a threaded tubular (such as the coupling 22 or tubular 14) and a mark 30 on another threaded tubular 20;

3. threading together the tubular 20 and coupling 22;

4. during the threading step, inputting position data from the image processor 54 to a controller 52 (see FIG. 7), the position data being indicative of the position of the mark 30 relative to the position of the coupling 22; and 5. the controller 52 terminating the threading step in response to the position of the mark 30 relative to the position of the coupling 22 being within a predetermined range.

The position of the coupling 22 may include an azimuthal position of a mark 30 on the coupling 22, and the position of the mark 30 on the tubular 20 may include an azimuthal position of the mark 30 on the tubular 20.

The terminating step may include the controller 52 terminating the threading in response to the azimuthal position of the mark 30 on the tubular 20 relative to the azimuthal position of the mark 30 on the coupling 22 being within the predetermined range. The predetermined range may correspond to azimuthal alignment of the marks 30 on the coupling 22 and the tubular 20.

The terminating step may include the controller 52 terminating the threading in response to the azimuthal position of the mark 30 on the tubular 20 relative to the azimuthal position of the mark 30 on the coupling 22 being within the predetermined range after the coupling 22 and the tubular 20 are shouldered up.

Figure 4A:
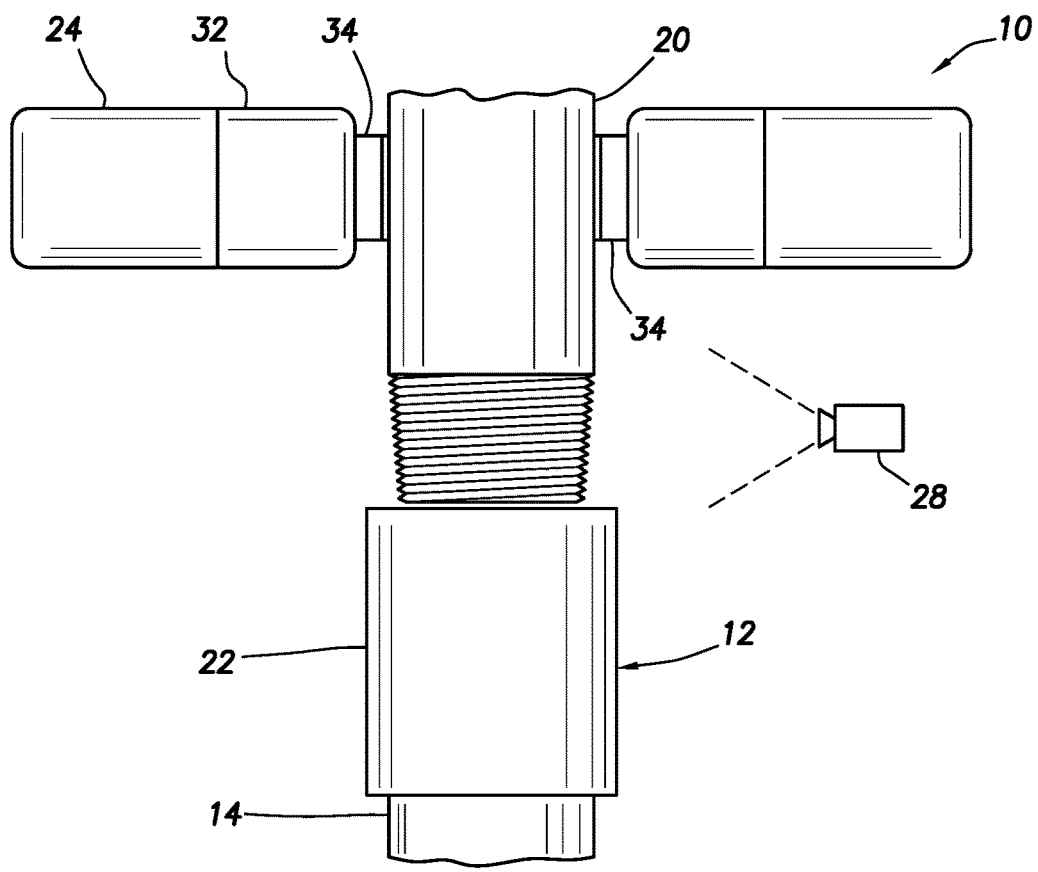
FIGS. 4A & B are representative side views of another example of the method, with a threaded connection in respective preliminary and made-up configurations.

Referring additionally now to FIGS. 4A & B, a third example of the method of making-up tubular string components is representatively illustrated. In this example, at least one camera 28 is used to observe the tubular 20 and the coupling 22, in order to determine when a desired total thread loss TTL has been achieved as an indication of a proper threaded connection make-up.

Total thread loss TTL in this example is an axial length of the lower end of the tubular 20 (which includes the external threads on the tubular) received in the coupling 22 during the threaded connection make-up process. As the tubular 20 is threaded into the coupling 22, the threaded lower end of the tubular 20 is gradually received into the upper end of the coupling. In this example, the total thread loss TTL corresponds to a longitudinal overlap of the first and second tubulars 22, 20.

As depicted in FIG. 4A, the tubular 20 is positioned above and axially aligned with the coupling 22. The camera 28 observes the tubular 20 and the coupling 22. Image data is output from the camera 28 to the image processor 54, which identifies or recognizes the tubular 20 and the coupling 22. Longitudinal positions of the lower end of the tubular 20 and the upper end of the coupling 22 are determined.

Alternatively, relative longitudinal positions, or a longitudinal distance between the positions of the lower end of the tubular 20 and the upper end of the coupling 22, can be determined. As another alternative, the tubular 20 may be lowered until the longitudinal position of the lower end of the tubular 20 is the same as the longitudinal position of the upper end of the coupling 22, so that a longitudinal distance the tubular 20 is received into the coupling can be computed from this reference point.

Figure 4B:
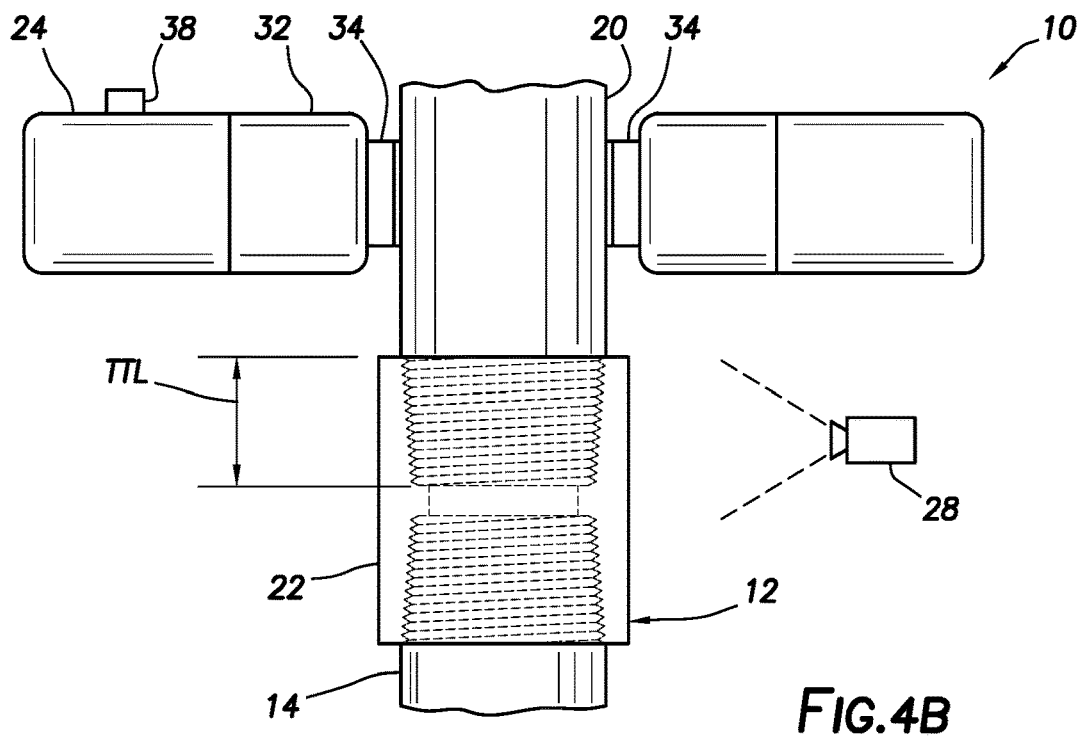

As depicted in FIG. 4B, the tubular 20 has been rotated by the rotary clamp 24, so that the tubular 20 is threaded into the coupling 22. The total thread loss TTL is now at a desired value, or within a predetermined range. The controller 52 terminates the rotation of the tubular 20 by the rotary clamp 24 when the desired total thread loss TTL is achieved, or when the TTL is within the predetermined range.

A sensor 38 (such as a position sensor, a proximity sensor, a displacement sensor, etc.) may be used to measure longitudinal displacement of the tubular 20 as it is threaded into the coupling 22, in order to determine the TTL. For example, the longitudinal positions of the lower end of the tubular 20 and the upper end of the coupling 22 may be determined at the initiation of the threaded connection make-up process (see FIG. 4A), thereby allowing a calculation of the required downward longitudinal displacement of the tubular 20 required in order to achieve the desired TTL. When the tubular 20 has displaced the required longitudinal distance as it is threaded into the coupling 22 (see FIG. 4B), the controller 52 can terminate the threaded connection make-up process by ceasing rotation of the tubular 20 by the rotary clamp 24.

In the FIGS. 4A & B example, the method can include the steps of:

1. inputting image data to an image processor 54 (see FIG. 7), the image data being output from at least one camera 28;

2. in response to the inputting, the image processor 54 detecting longitudinal positions of a coupling 22 (or other threaded tubular) and another threaded tubular 20;

3. threading together the coupling 22 and the tubular 20;

4. inputting position data from the image processor 54 to a controller 52 (see FIG. 7), the position data being indicative of the longitudinal position of the tubular 20 relative to the longitudinal position of the coupling 22; and 5. the controller 52 terminating the threading in response to the longitudinal position of the tubular 20 relative to the longitudinal position of the coupling 22 being within a predetermined range.

The predetermined range may comprise a desired total thread loss TTL between the tubulars 22, 20.

During the threading step, the longitudinal position of the tubular 20 relative to the longitudinal position of the coupling 22 may include a total thread loss TTL corresponding to a longitudinal overlap of the coupling 22 and the tubular 20.

The longitudinal position of the coupling 22 may comprise a longitudinal position of an end of the coupling 22, and the longitudinal position of the tubular 20 may comprise a longitudinal position of an end of the tubular 20.

The detecting step may include detecting when the longitudinal position of the end of the tubular 20 is the same as the longitudinal position of the end of the coupling 22. After detecting when the longitudinal position of the end of the tubular 20 is the same as the longitudinal position of the end of the coupling 22, the detecting step may include detecting a longitudinal displacement of the tubular 20 relative the coupling 22. The terminating step may include terminating the threading in response to the longitudinal displacement of the tubular 20 relative to the coupling 22 being within the predetermined range.

Figure 5A:
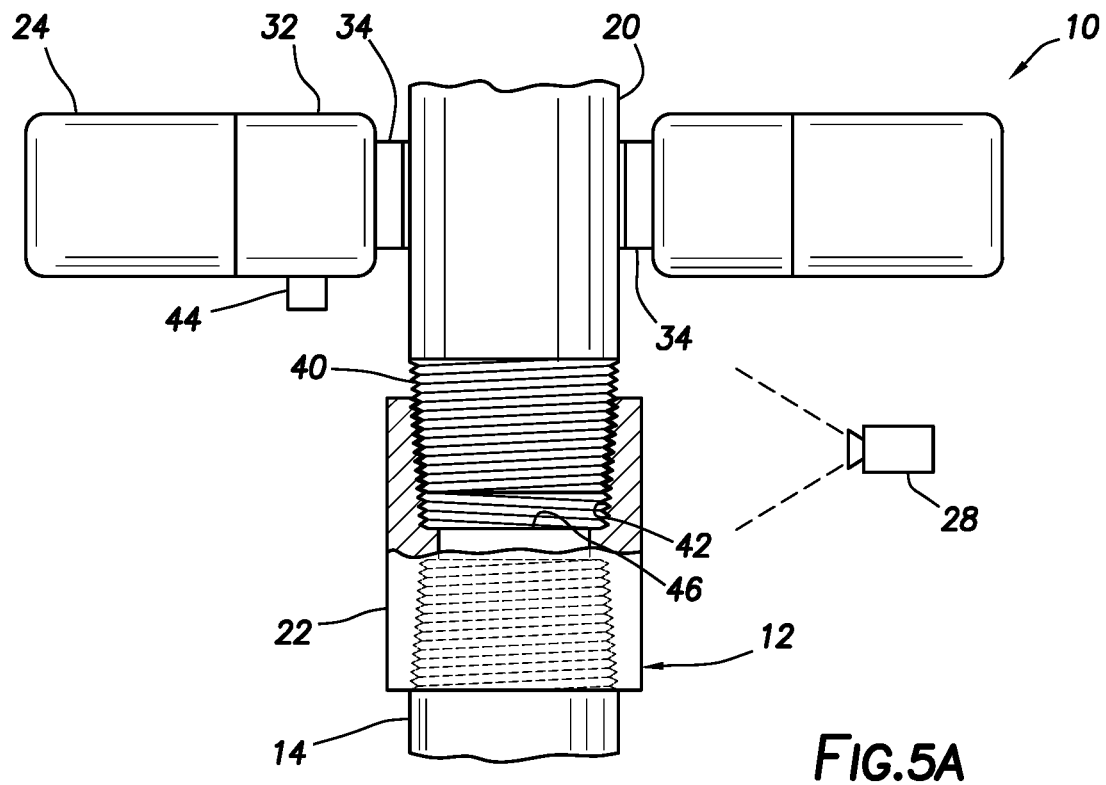
FIGS. 5A & B are representative side views of another example of the method, with a threaded connection in respective preliminary and made-up configurations.

Referring additionally now to FIGS. 5A & B, a fourth example of the method of making-up tubular string components is representatively illustrated. In this example, at least one camera 28 is used to observe the tubular 20 and the coupling 22, in order to determine when a desired number of rotations of the tubular 20 have been performed as an indication of a proper threaded connection make-up. The number of rotations are counted after a thread start on the tubular 20 is operatively aligned with a thread start on the coupling 22.

The camera 28 may be used to observe only the tubular 20 in order to monitor rotation of the tubular 20. Alternatively, the camera 28 may be used to observe both of the tubular 20 and the coupling 22, for example, so that insertion of the tubular 20 into the coupling 22 can be detected or confirmed, and then rotation of the tubular 20 relative to the coupling can be monitored.

As depicted in FIG. 5A, the tubular 20 has been positioned above and axially aligned with the coupling 22, and then the tubular 20 has been lowered until the threads 40 on an exterior of the tubular 20 contact the threads 42 on an interior of the coupling 22. As mentioned above, the camera 28 can be used to confirm that this insertion of the tubular 20 into the coupling 22 has been accomplished.

At this point, the threads 40, 42 are contacting each other, but are not yet operatively threaded together. Confirmation that this contact between the threads 40, 42 has been achieved can be obtained by monitoring a load cell measurement (such as a hook weight measurement or a top drive load cell measurement), which should show a decrease in supported load when the threads 40, 42 contact each other. This contact between the threads 40, 42 should occur after the insertion of the tubular 20 into the coupling 22 is confirmed as discussed above.

After the contact between the threads 40, 42 is confirmed, the tubular 20 is rotated by the rotary clamp 24 in a rotary direction that is opposite to a rotary direction that will later be used to thread the tubular 20 into the coupling 22. For example, if the threads 40, 42 on the tubular 20 and coupling 22 are right-hand threads, so that the tubular 20 will later be threaded into the coupling by rotating the tubular 20 in a clockwise direction as viewed from above, then the tubular 20 will initially be rotated in an opposite (counter-clockwise) direction. If the threads 40, 42 on the tubular 20 and coupling 22 are left-hand threads, then the tubular 20 will initially be rotated in a clockwise direction. For convenience of description, it is assumed hereafter that the threads 40, 42 are right-hand threads, so that the tubular 20 is initially rotated in a counter-clockwise direction after the threads contact each other.

As the tubular 20 is rotated in the counter-clockwise direction, a thread start on the tubular 20 will eventually be azimuthally aligned with a thread start on the coupling 22. This azimuthal alignment will permit some axially downward displacement of the tubular 20, so that the threads 40, 42 are appropriately positioned for threading the tubular 20 into the coupling 22.

When the thread starts become azimuthally aligned and the tubular 20 displaces downward somewhat, the threads 40, 42 will again come into contact with each other, which will produce a detectable vibration. This vibration can be measured using a sensor 44 (such as, an acoustic sensor, an accelerometer, etc.). Alternatively, a displacement or position sensor (such as the sensor 38, see FIG. 4B) may be used to measure the downward displacement of the tubular 20. The downward displacement and vibration should occur after the tubular 20 is rotated in the counter-clockwise direction in this example.

Figure 5B:
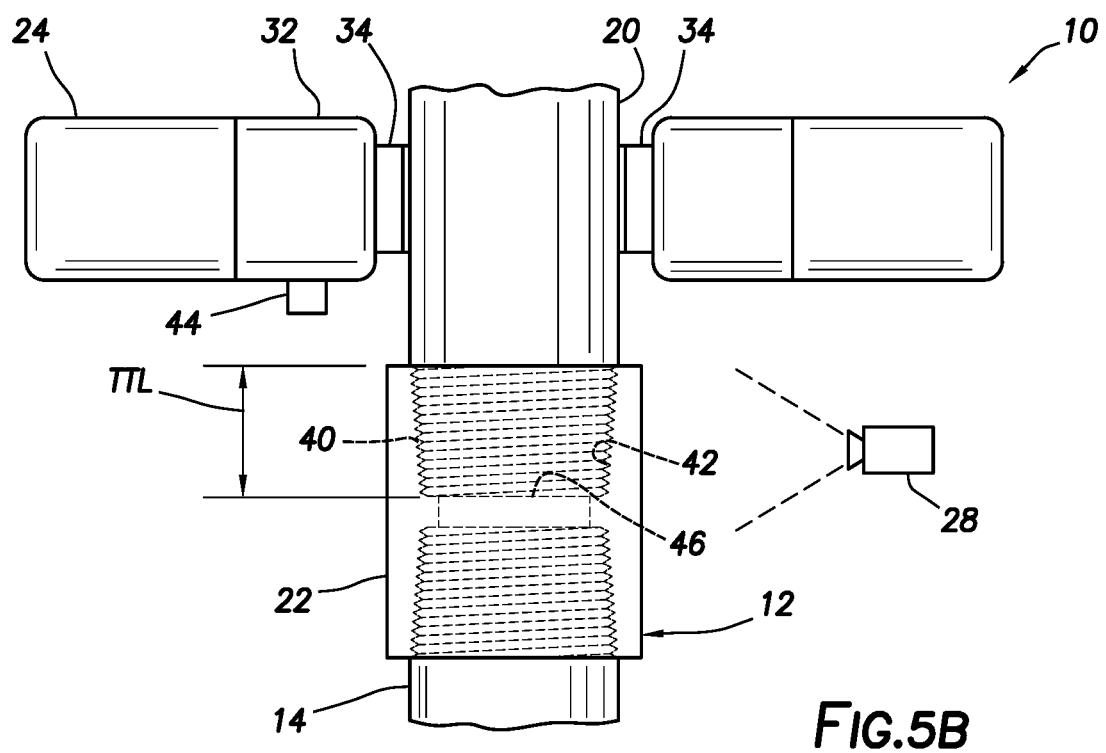

After the downward displacement and/or vibration is detected, the tubular 20 is rotated in an opposite rotary direction (clockwise in this example) by the rotary clamp 24, in order to thread the tubular 20 into the coupling 22 as depicted in FIG. 5B. The camera 28 can be used to observe the rotation of the tubular 20, so that a number of turns or rotations of the tubular can be measured. When it is determined that a desired number of turns or rotations have been achieved, the controller will terminate the rotation of the tubular 20 by the rotary clamp 24.

Alternatively, the tubular 20 may be rotated in the clockwise direction until a desired TTL is achieved, as described above for the FIGS. 4A & B example. As another alternative, the tubular 20 may be rotated in the clockwise direction until the tubular 20 shoulders up against the coupling 22 and a desired torque is applied to the threaded connection. For example, the shouldering-up can be indicated by a substantial increase in applied torque rate upon contact of the lower end of the tubular 20 with an annular shoulder 46 in the coupling 22.

Figure 6A:
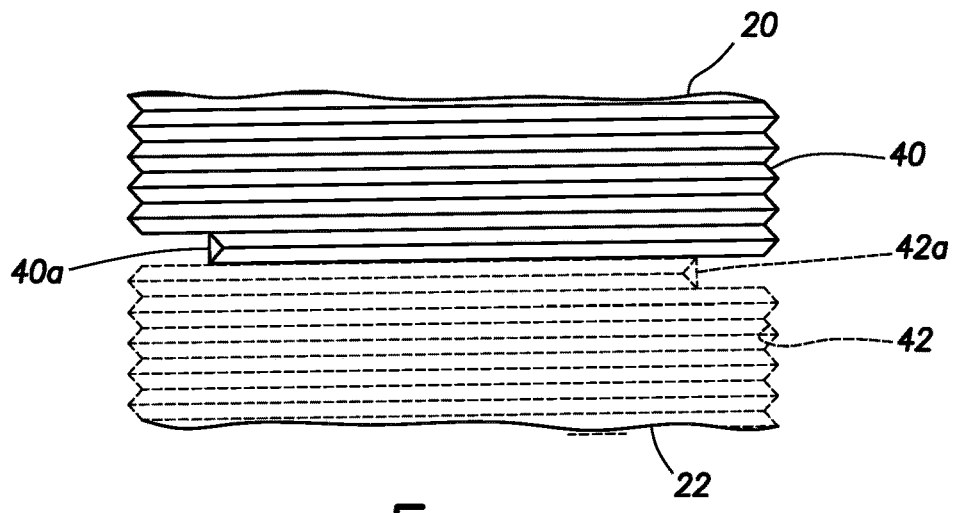
FIGS. 6A-C are representative side views of threads in the FIGS. 5A & B example of the method, with thread starts of the threaded connection in successive azimuthally misaligned, azimuthally aligned and operatively aligned configurations.
Figure 6B:
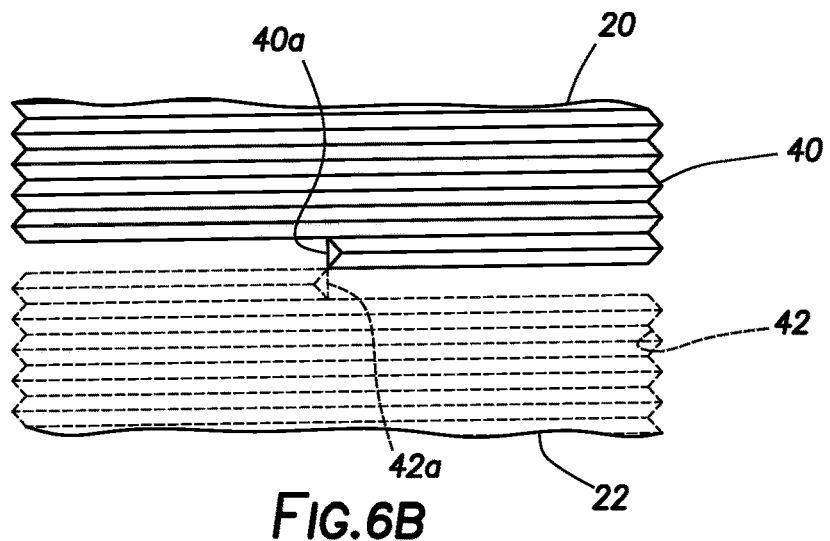
Figure 6C:
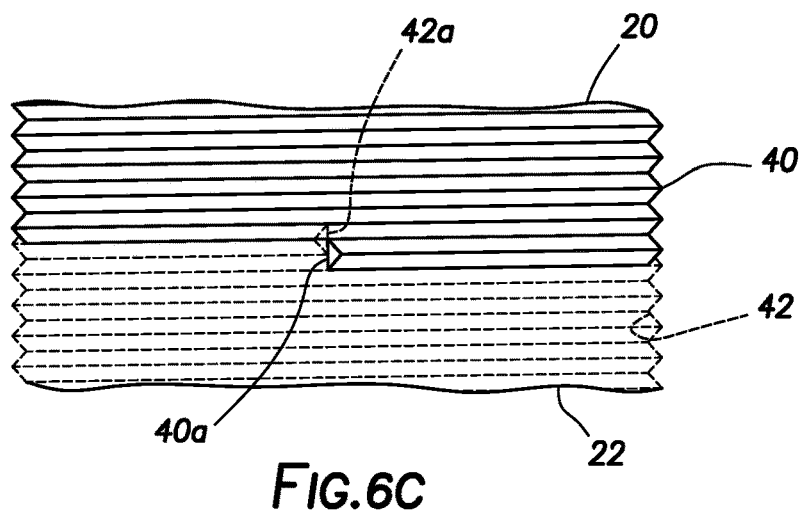

Referring additionally now to FIGS. 6A-C, the threads 40, 42 on the tubular 20 and coupling 22 are representatively illustrated in configurations corresponding to the threaded connection make-up process described above for the FIGS. 5A & B example. For convenience of illustration and description, only the threads 40, 42 are depicted in FIGS. 6A-C. The external threads 40 on the tubular 20 are shown in solid lines, and the internal threads on the coupling 22 are shown in dashed lines.

As depicted in FIG. 6A, the threads 40, 42 are in contact with each other, as described above with regard to FIG. 5A. Note that a thread start 40*a* of the threads 40 is not azimuthally aligned with a thread start 42*a* of the threads 42. At least a portion of a weight of the tubular 20 is supported by the contact between the threads 40, 42 in an area azimuthally between the thread starts 40*a*, 42*a*.

As depicted in FIG. 6B, the tubular 20 has been rotated in the counter-clockwise direction until the thread starts 40*a*, 42*a* are azimuthally aligned. At this point, the weight of the tubular 20 is no longer supported by the contact between the threads 40, 42.

As depicted in FIG. 6C, the tubular 20 has displaced downward somewhat, until at least a portion of the weight of the tubular 20 is again supported by contact between the threads 40, 42. This downward displacement and/or vibration produced by the displacement and then contact between the threads 40, 42 can be measured by the sensor 38 and/or 44 as described above.

The threads 40, 42 are now operatively aligned for threading the tubular 20 into the coupling 22. The tubular 20 can now be rotated in the clockwise direction by the rotary clamp 24 as described above in order to make-up the threaded connection.

In the FIGS. 5A-6C example, the method can include the steps of:
 1. supporting a threaded tubular (such as the coupling 22 and/or the tubular 14) relative to a rig floor 18 (see FIG. 1);
 2. engaging a threaded tubular 20 with the coupling 22;
 3. rotating the tubular 20 relative to the coupling 22 in a first direction, thereby producing a detectable vibration or longitudinal displacement when a thread start 40*a* on the tubular 20 is azimuthally aligned with a thread start 42*a* on the coupling 22; and
 4. then rotating the tubular 20 relative to the coupling 22 in a second direction opposite to the first direction, thereby threading together the coupling 22 and the tubular 20.

The method may include inputting image data to an image processor 54 (see FIG. 7), the image data being output from at least one camera 28; and in response to the inputting step, the image processor 54 detecting the rotating of the tubular 20 relative to the coupling 22 in the second direction.

The method may include inputting rotation data from the image processor 54 to a controller 52 (see FIG. 7), the rotation data being indicative of a total rotation of the tubular 20 relative to the coupling 22 in the second direction; and the controller 52 terminating the threading in response to the total rotation of the tubular 20 relative to the coupling 22 in the second direction being within a predetermined range.

The method may include a sensor 44 detecting the vibration produced when the thread start 40*a* on the tubular 20 is azimuthally aligned with the thread start 42*a* on the coupling 22.

The method may include a sensor 38 detecting the longitudinal displacement produced when the thread start 40*a* on the tubular 20 is azimuthally aligned with the thread start 42*a* on the coupling 22.

Figure 7:
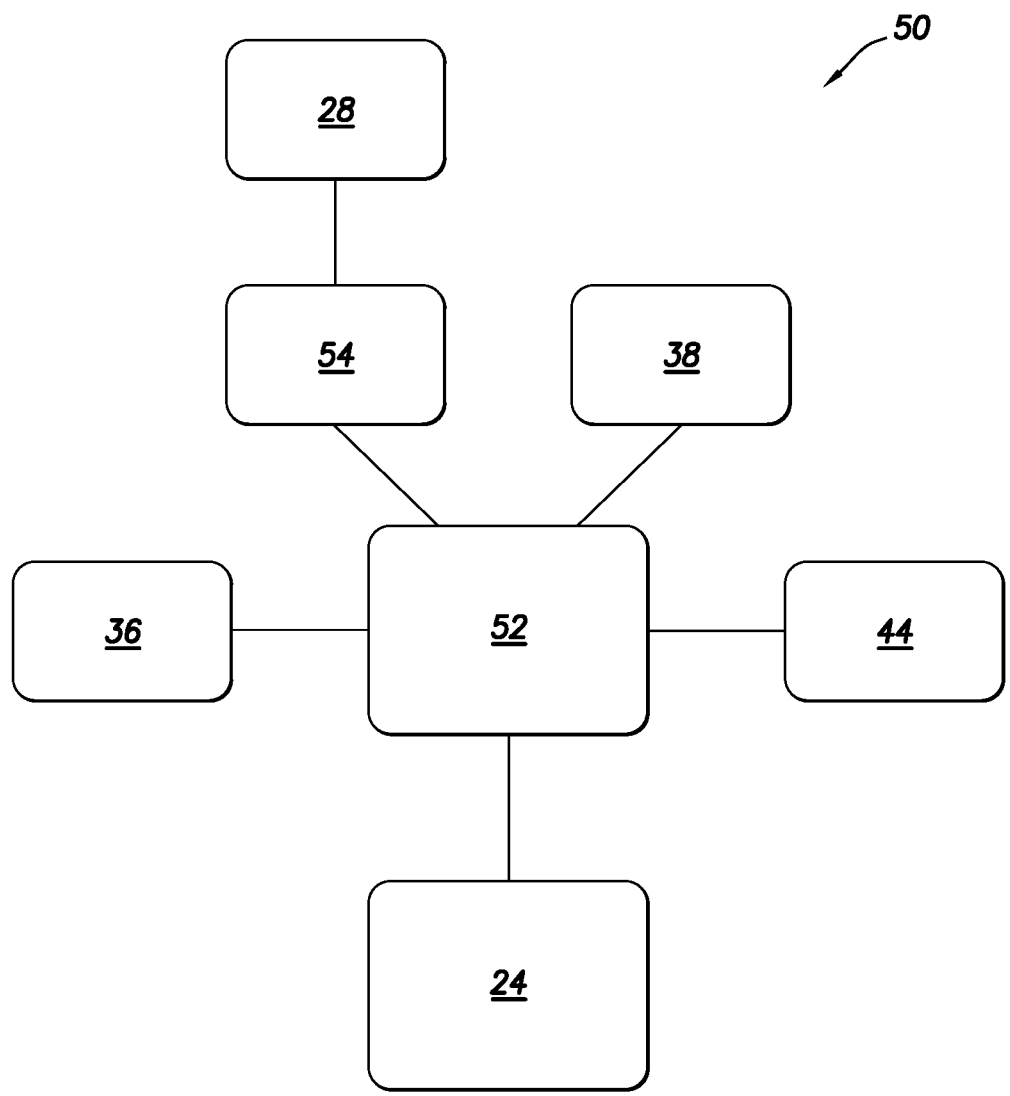
FIG. 7 is a representative schematic view of an example of a make-up control system that may be used with the method examples of FIGS. 2A-6C.

Referring additionally now to FIG. 7, a schematic view of an example of a make-up control system 50 that may be used with the system 10 of FIG. 1 and the method examples of FIGS. 2A-6C is representatively illustrated. The make-up control system 50 may be used with other systems and methods in keeping with the principles of this disclosure.

The make-up control system 50 includes a controller 52 for controlling operation of various components of the system 10. In this example, the controller 52 is connected to the rotary clamp 24 for controlling rotation of the tubular 20. In examples described above, the controller 52 can terminate or cease the rotation of the tubular 20 by the rotary clamp 24 when a proper threaded connection has been achieved, for example, to avoid over-torquing the threaded connection, to avoid human error, to achieve a greater level of efficiency, etc. The scope of this disclosure is not limited to any particular purpose or benefit obtained by use of the controller 52 in the system 50.

The controller 52 can include various components designed to facilitate the operation of the system 50. For example, the controller 52 may include volatile and non-volatile memory (such as RAM, ROM, EPROM, a hard drive or solid state drive, etc.), a database and instructions stored in the memory, data ports, input devices (such as a keyboard, keypad, touch screen, mouse, etc.), output devices (such as a monitor, a printer, etc.), communication devices (such as a satellite link, a fiber optic connection, a WiFi or Bluetooth transceiver, etc.), a computer processor, a programmable logic controller (PLC) or any other component or combination of components. The scope of this disclosure is not limited to any particular configuration, structure or capability of the controller 52.

As depicted in FIG. 7, at least one camera 28 is connected to an image processor 54. The image processor 54 receives image data from the camera 28 and, based on the image data, identifies or recognizes tubular string components (such as the tubular 20 and/or coupling 22) as represented in the image data. In addition, the image processor 54 may be able to identify or recognize movements of the tubular string components as represented in the image data.

The image processor 54 can include various components and capabilities designed to facilitate the identification or recognition of the tubular string components and their movements. For example, the image processor 54 may include neural or neuronal networks, fuzzy logic, artificial intelligence or other programmed capabilities that may be trained to identify or recognize particular tubular string components. The image processor 54 may include or comprise elements known to those skilled in the art as an image processing engine, an image processing unit or an image signal processor. Techniques such as optical flow techniques may be used to identify, recognize and quantify movements (such as longitudinal displacements and/or rotations) of the tubular string components. The scope of this disclosure is not limited to any particular configuration, structure or capability of the image processor 54.

The controller 52 may also receive outputs from various sensors of the system 10, such as the position or displacement sensor 38, the vibration sensor 44, a sensor that measures torque applied to the threaded connection, a sensor that measures hook weight, a load cell, etc. Any type or combination of sensors may provide outputs to the controller 52 in keeping with the principles of this disclosure.

The controller 52 may be in communication with the aerial vehicle 36, for example, via a wireless connection in the FIGS. 2B & 3B examples. In this manner, a flight path of the aerial vehicle 36 may be controlled by the controller 52 in response to the position data output from the image processor 54, so that the camera 28 supported by the aerial vehicle rotates with the tubular 20 as it is threaded into the coupling 22.

It may now be fully appreciated that the above disclosure provides significant advancements to the art of making-up threaded connections in tubular strings. In various examples described above, methods are provided which produce properly made-up threaded connections in a manner that reduces or eliminates human error and improves efficiency of the threaded connection make-up process.

More specifically, the above disclosure provides to the art a method of making-up tubular string components for use in a subterranean well. In one example, the method can include the steps of: inputting image data to an image processor 54, the image data being output from at least one camera 28; in response to the inputting, the image processor 54 detecting positions of a threaded first tubular (such as the coupling 22 or tubular 14) and a mark 30 on a threaded second tubular 20; threading the first and second tubulars 22, 20 with each other; during the threading, inputting position data from the image processor 54 to a controller 52, the position data being indicative of the position of the mark 30 relative to the position of the first tubular 22; and the controller 52 terminating the threading in response to the position of the mark 30 relative to the position of the first tubular 22 being within a predetermined range.

The controller 52 may terminate the threading in response to a longitudinal distance between the positions of the first tubular 22 and the mark 30 being within the predetermined range.

The threading may include rotating the second tubular 20 relative to the first tubular 22.

The camera 28 may rotate with the second tubular 20 during the threading.

The method may include connecting the camera 28 to a rotor 32 used to rotate the second tubular 20, so that the camera 28 rotates with the rotor 32.

The method may include connecting the camera 28 to an aerial vehicle 36. A flight path of the aerial vehicle 36 may be controlled by the controller 52 in response to the position data output from the image processor 54.

The position of the first tubular 22 may include an azimuthal position of a mark 30 on the first tubular 22, and the position of the mark 30 on the second tubular 20 may include an azimuthal position of the mark 30 on the second tubular 20.

The terminating step may include the controller 52 terminating the threading in response to the azimuthal position of the mark 30 on the second tubular 20 relative to the azimuthal position of the mark 30 on the first tubular 22 being within the predetermined range.

The predetermined range may correspond to azimuthal alignment of the marks 30 on the first and second tubulars 22, 20.

The terminating step may include the controller 52 terminating the threading in response to the azimuthal position of the mark 30 on the second tubular 20 relative to the azimuthal position of the mark 30 on the first tubular 22 being within the predetermined range after the first and second tubulars 22, 20 are shouldered up.

The "at least one" camera 28 may comprise multiple cameras 28 distributed circumferentially about the first and second tubulars 22, 20.

Another method of making-up tubular string components for use in a subterranean well is provided to the art by the above disclosure. In this example, the method can include: inputting image data to an image processor 54, the image data being output from at least one camera 28; in response to the inputting, the image processor 54 detecting longitudinal positions of a threaded first tubular (such as the coupling 22 and/or the tubular 14) and a threaded second tubular 20; threading the first and second tubulars 22, 20 with each other; inputting position data from the image processor 54 to a controller 52, the position data being indicative of the longitudinal position of the second tubular 20 relative to the longitudinal position of the first tubular 22; and the controller 52 terminating the threading in response to the longitudinal position of the second tubular 20 relative to the longitudinal position of the first tubular 22 being within a predetermined range.

During the threading step, the longitudinal position of the second tubular 20 relative to the longitudinal position of the first tubular 22 may include a total thread loss TTL corresponding to a longitudinal overlap of the first and second tubulars 22, 20.

The predetermined range may comprise a desired total thread loss TTL between the first and second tubulars 22, 20.

The longitudinal position of the first tubular 22 may comprise a longitudinal position of an end of the first tubular 22, and the longitudinal position of the second tubular 20 may comprise a longitudinal position of an end of the second tubular 20.

The detecting step may include detecting when the longitudinal position of the end of the second tubular 20 is the same as the longitudinal position of the end of the first tubular 22. After detecting when the longitudinal position of the end of the second tubular 20 is the same as the longitudinal position of the end of the first tubular 22, the detecting step may include detecting a longitudinal displacement of the second tubular 20 relative the first tubular 22. The terminating step may include terminating the threading in response to the longitudinal displacement of the second tubular 20 relative to the first tubular 22 being within the predetermined range.

Another method of making-up tubular string components for use in a subterranean well is described above. In this example, the method can include: supporting a threaded first tubular (such as the coupling 22 and/or the tubular 14) relative to a rig floor 18; engaging a threaded second tubular 20 with the first tubular 22; rotating the second tubular 20 relative to the first tubular 22 in a first direction, thereby producing at least one of a detectable vibration and a longitudinal displacement, when a thread start 40a on the second tubular 20 is azimuthally aligned with a thread start 42a on the first tubular 22; and then rotating the second tubular 20 relative to the first tubular 22 in a second direction opposite to the first direction, thereby threading together the first and second tubulars 22, 20.

The method may include inputting image data to an image processor 54, the image data being output from at least one camera 28; and in response to the inputting step, the image processor 54 detecting the rotating of the second tubular 20 relative to the first tubular 22 in the second direction.

The method may include inputting rotation data from the image processor 54 to a controller 52, the rotation data being indicative of a total rotation of the second tubular 20 relative to the first tubular 22 in the second direction; and the controller 52 terminating the threading in response to the total rotation of the second tubular 20 relative to the first tubular 22 in the second direction being within a predetermined range.

The method may include a sensor 44 detecting the vibration, or a sensor 38 detecting the longitudinal displacement, produced when the thread start 40a on the second tubular 20 is azimuthally aligned with the thread start 42a on the first tubular 22.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations and configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of making-up tubular string components for use in a subterranean well, the method comprising:
    inputting image data to an image processor, the image data being output from at least one camera;
    in response to the inputting, the image processor detecting positions of a threaded first tubular and a mark on a threaded second tubular;
    threading the first and second tubulars with each other;
    during the threading, inputting position data from the image processor to a controller, the position data being indicative of the position of the mark relative to the position of the first tubular; and
    the controller terminating the threading in response to the position of the mark relative to the position of the first tubular being within a predetermined range.

2. The method of claim 1, in which the controller terminates the threading in response to a longitudinal distance between the positions of the first tubular and the mark being within the predetermined range.

3. The method of claim 1, in which the threading comprises rotating the second tubular relative to the first tubular, and in which the camera rotates with the second tubular during the threading.

4. The method of claim 3, further comprising connecting the camera to a rotor used to rotate the second tubular, whereby the camera rotates with the rotor.

5. The method of claim 3, further comprising connecting the camera to an aerial vehicle, and a flight path of the aerial vehicle being controlled by the controller in response to the position data input from the image processor.

6. The method of claim 1, in which the position of the first tubular comprises an azimuthal position of a mark on the first tubular, and the position of the mark on the second tubular comprises an azimuthal position of the mark on the second tubular.

7. The method of claim 6, in which the terminating further comprises the controller terminating the threading in response to the azimuthal position of the mark on the second tubular relative to the azimuthal position of the mark on the first tubular being within the predetermined range.

8. The method of claim 7, in which the predetermined range corresponds to azimuthal alignment of the marks on the first and second tubulars.

9. The method of claim 6, in which the terminating further comprises the controller terminating the threading in response to the azimuthal position of the mark on the second tubular relative to the azimuthal position of the mark on the first tubular being within the predetermined range after the first and second tubulars are shouldered up.

10. The method of claim 1, in which the at least one camera comprises multiple cameras distributed circumferentially about the first and second tubulars.

11. A method of making-up tubular string components for use in a subterranean well, the method comprising:

inputting image data to an image processor, the image data being output from at least one camera;

in response to the inputting, the image processor detecting longitudinal positions of a threaded first tubular and a threaded second tubular;

threading the first and second tubulars with each other;

inputting position data from the image processor to a controller, the position data being indicative of the longitudinal position of the second tubular relative to the longitudinal position of the first tubular; and the controller terminating the threading in response to the longitudinal position of the second tubular relative to the longitudinal position of the first tubular being within a predetermined range.

12. The method of claim 11, in which, during the threading, the longitudinal position of the second tubular relative to the longitudinal position of the first tubular comprises a total thread loss corresponding to a longitudinal overlap of the first and second tubulars.

13. The method of claim 11, in which the predetermined range comprises a desired total thread loss between the first and second tubulars.

14. The method of claim 11, in which the longitudinal position of the first tubular comprises a longitudinal position of an end of the first tubular, and the longitudinal position of the second tubular comprises a longitudinal position of an end of the second tubular.

15. The method of claim 14, in which the detecting further comprises detecting when the longitudinal position of the end of the second tubular is the same as the longitudinal position of the end of the first tubular.

16. The method of claim 15, in which the detecting further comprises, after the detecting when the longitudinal position of the end of the second tubular is the same as the longitudinal position of the end of the first tubular, detecting a longitudinal displacement of the second tubular relative the first tubular, and in which the terminating further comprises terminating the threading in response to the longitudinal displacement of the second tubular relative to the first tubular being within the predetermined range.

\* \* \* \* \*